Patented Oct. 3, 1950

2,524,503

UNITED STATES PATENT OFFICE 2,524,503

PREPARATION OF TETRAHYDROPYRAN-2-METHANOL

Joseph D. C. Wilson, II, Wilmington Manor, Del., assignor to E. I. du Pont de Nemours & Company, Wilmington, Del., a corporation of Delaware No Drawing. Application July 5, 1949, Serial No. 103,171

2 Claims. (Cl. 260—333)

This invention relates to tetrahydropyran-2-methanol and to a novel process for its preparation.

The carbinol group (—CH$_2$OH) can ordinarily be introduced with relative ease on the ring of aromatic compounds, such as the phenols and naphthalene, by reaction with formaldehyde. However, simple direct methods are lacking for accomplishing this feat with certain non-aromatic ring compounds such as, for example, tetrahydropyran. The discovery of an attractive method for the preparation of the ring-substituted methylol derivatives of this heterocyclic compound, particularly a one-step process, based on cheap raw materials would be a valuable addition to chemical technology.

It is an object of this invention to provide a novel process for the preparation of tetrahydropyran-2-methanol. A further object is to provide a one-step process for the preparation of tetrahydropyran-2-methanol based on inexpensive raw materials. Other objects will appear hereinafter.

The objects of this invention are accomplished by providing a novel process for the production of tetrahydropyran - 2 - methanol (2 - hydroxymethyltetrahydropyran) which comprises heating tetrahydrofuran with carbon monoxide and hydrogen to reaction temperature under superatmospheric pressure in the presence of a hydrogenation catalyst, such as a cobalt-containing hydrogenation catalyst.

In one method of practicing this invention, the tetrahydrofuran is charged into a suitable pressure-resistant reaction vessel with 5 to 10% of its weight of the selected hydrogenation catalyst, for example, a cobalt hydrogenation catalyst, such as reduced sintered cobalt oxide. A mixture of carbon monoxide and hydrogen is then injected at ordinary temperature into the reaction vessel under high pressure after which the reactants are heated, preferably in the range of 200–250° C. under superatmospheric pressure, particularly pressures of 900–1500 atms., until the reaction is completed or until no further pressure drop can be noted. Suitable pressures are maintained during the reaction with carbon monoxide, hydrogen, or with mixtures of these two gases. After completion of the reaction, the vessel is cooled, excess gases are bled off, the contents are discharged, and the tetrahydropyran-2-methanol is isolated by distillation.

The time necessary to complete the reaction will vary from 1 to 15 hours or more, depending to a large extent on the pressure and temperature employed. The reaction temperature is usually from about 200 to 300° C. with pressures of 800 atm. or more. The maximum pressure is determined by the strength of the reaction vessel. The best results, however, are obtained under pressures within the range of 900–1500 atms. and temperatures of 200 to 250° C. Under these preferred conditions, two to ten hours is ordinarily sufficient reaction time.

The invention is illustrated in greater detail in the following examples:

Example I

A silver-lined pressure-resistant reaction tube of 400 cc. capacity was charged with 178 grams of tetrahydrofuran and 10 grams of reduced cobalt oxide catalyst. The vessel was closed and pressured at room temperature to 400 atm. with hydrogen. The temperature was raised to 200° C. and the pressure was then adjusted to 1000 atm. by injection of carbon monoxide. Reaction was continued at 200° C. for four hours during which time the pressure was maintained between 900–980 atm. with carbon monoxide.

At the end of this time the reaction vessel was cooled, bled of excess gases, opened and the contents discharged. This procedure was twice repeated until a total of 534 grams of tetrahydrofuran had been processed. The combined reaction mixture was distilled isothermally at 200° C. Fractionation of this distillate yielded 98.3 grams of tetrahydropyran-2-methanol, a colorless, water-soluble liquid which possessed the following constants:

B. P., 117–121° C./95 mm.
B. P., 185–186° C.
$n_D^{25}$, 1.4522–1.4526
$d_{25}^{25}$, 1.026

Anal. Calc'd for $C_6H_{12}O_2$: C, 62.07%; H, 10.43%.
Found: C, 62.00%; 62.02%; H, 10.39%; 10.35%.

The product was unaffected by acid hydrolysis and gave negative tests for carbonyl and carboxyl groups. Infrared measurements, however, showed the presence of a hydroxyl group which was further confirmed by the preparation of a 3,5-dinitrobenzoate melting at 85.5–86.5° C. This derivative did not depress the melting point of the 3,5-dinitrobenzoate of tetrahydropyran-2-methanol (2 - hydroxymethyltetrahydropyran) synthesized by lithium aluminum hydride (LiAlH$_4$) reduction of 2-carboxytetrahydropyran. This, together with a comparison of other properties and infrared measurements, proved that the two samples of tetrahydropyran-2-methanol prepared by separate methods were identical.

Example II

Employing the same procedure as described in Example I the tube containing a charge of 72 grams of tetrahydrofuran and 5 grams of cobalt catalyst was pressured at room temperature to 200 atm. of hydrogen after which the temperature was raised to 200° C. where tube pressure was adjusted to 1000 atm. by injection of carbon monoxide. The reaction was then continued as in Example I for four hours at 200° C. with the pressure being maintained between 900–980 atm. with carbon monoxide. Distillation gave 8 grams of tetrahydropyran-2-methanol, boiling point 70–72° C./8 mm.

Example III

A solution of 72 grams of tetrahydrofuran and 95 grams of methanol with 5 grams of cobalt catalyst was processed with carbon monoxide and hydrogen in accordance with the procedure described in Example II to give 12.1 grams of crude tetrahydropyran-2-methanol.

Example IV

Employing the same method as described in Example II, 178 grams of tetrahydrofuran with 15 grams of cobalt catalyst was treated with carbon monoxide and hydrogen at a temperature of 250° C. for four hours under 900–980 atms. pressure to give 10.5 grams of crude tetrahydropyran-2-methanol.

It is to be understood that the invention can, in addition to the batch operations illustrated above, be practiced by continuous procedures. If desired, solvents, inert for the purpose of this reaction, for example, alcohols, such as methanol, ethanol, etc. can be employed but this or any other solvent is not essential for the satisfactory operation of the invention.

The initial mole ratio of tetrahydrofuran to carbon monoxide can vary widely in the process of this invention, for example, from 1:2 to 1:20 or more, but ordinarily the best results are obtained with a mole ratio of from 1:2 to 1:10. The mole ratio of carbon monoxide to hydrogen may range from about 1:4 to 4:1. It is desirable, however, to operate with an excess of hydrogen, preferably with a mole ratio of carbon monoxide to hydrogen of about 2:3. Irrespective of this ratio, the initial amount of carbon monoxide should, for optimum conversions, be in the proportion of at least two moles for each mole of tetrahydrofuran treated.

Among the best hydrogenation catalysts are those containing cobalt, for example, metallic cobalt, reduced sintered cobalt oxide, cobalt carbonyl, and the like. In general, the amount of catalyst employed can be as low as 0.1% or as high as 10%, based on the weight of the tetrahydrofuran. The amount necessary depends considerably on the activity of the particular hydrogenation catalyst employed, the smaller quantities being used with the more effective catalysts. With the preferred cobalt catalysts excellent results are usually achieved with 1 to 10% of the weight of the tetrahydrofuran being treated.

The tetrahydropyran-2-methanol obtained in accordance with this invention is an extremely effective solvent for resins, particularly the alkyd type, and is also useful as an intermediate for the preparation of plasticizers and pharmaceuticals.

As many apparently widely different embodiments of this invention may be made without departing from the spirit and scope thereof, it is to be understood that this invention is not limited to the specific embodiments thereof except as defined in the appended claims.

I claim:

1. A process for preparing tetrahydropyran-2-methanol which comprises heating tetrahydrofuran with carbon monoxide and hydrogen at a temperature of 200° to 300° C. under superatmospheric pressure of at least 800 atmospheres in the presence of a cobalt containing hydrogenation catalyst, and separating therefrom tetrahydropyran-2-methanol.

2. A process for preparing tetrahydropyran-2-methanol which comprises heating tetrahydrofuran with carbon monoxide and hydrogen at a temperature of 200° to 250° C. under superatmospheric pressure of 900 to 1500 atmospheres in the presence of a reduced cobalt oxide hydrogenation catalyst, and separating therefrom tetrahydropyran-2-methanol.

JOSEPH D. C. WILSON, II.

REFERENCES CITED

The following references are of record in the file of this patent:

UNITED STATES PATENTS

| Number | Name | Date |
|---|---|---|
| 2,365,623 | Bremner | Dec. 19, 1944 |
| 2,480,990 | Whetstone | Sept. 6, 1949 |

FOREIGN PATENTS

| Number | Country | Date |
|---|---|---|
| 913,941 | France | June 11, 1946 |

OTHER REFERENCES

Schniepp, J. Am. Chem. Soc. 68, 1646–1648 (1946).